(12) United States Patent
Vasconcelos et al.

(10) Patent No.: US 11,215,497 B2
(45) Date of Patent: Jan. 4, 2022

(54) MOVABLE AND MODULAR DEVICE FOR DYNAMIC WEIGHING OF ANIMALS

(71) Applicant: ROBERT BOSCH LIMITADA, Campinas (BR)

(72) Inventors: Alvaro Augusto Vasconcelos, Campinas (BR); Gustavo Henrique Ferro dos Santos, Paulínia (BR); Felipe Magno dos Reis, Campinas (BR)

(73) Assignee: ROBERT BOSCH LIMITADA, Campinas-sp (BR)

( * ) Notice: Subject to any disclaimer, the term of this patent is extended or adjusted under 35 U.S.C. 154(b) by 123 days.

(21) Appl. No.: 16/718,973

(22) Filed: Dec. 18, 2019

(65) Prior Publication Data
US 2020/0240828 A1     Jul. 30, 2020

(30) Foreign Application Priority Data
Dec. 19, 2018    (BR) ......................... 102018076551-5

(51) Int. Cl.
*G01G 17/08*     (2006.01)
*A01K 11/00*     (2006.01)
*G01G 21/22*     (2006.01)
*G01G 21/28*     (2006.01)

(52) U.S. Cl.
CPC ............ *G01G 17/08* (2013.01); *A01K 11/006* (2013.01); *G01G 21/22* (2013.01); *G01G 21/28* (2013.01)

(58) Field of Classification Search
CPC ........ G01G 17/08; G01G 21/22; G01G 21/28; A01K 11/006
See application file for complete search history.

(56) References Cited

U.S. PATENT DOCUMENTS

| 3,074,497 A | * | 1/1963 | Hawbaker | G01G 17/08 |
| | | | | 177/246 |
| 4,427,083 A | * | 1/1984 | Muddle | G01G 17/08 |
| | | | | 177/132 |

(Continued)

FOREIGN PATENT DOCUMENTS

| BR | PI 0505959-3 A | 10/2007 |
| BR | 102015026489-5 A2 | 5/2017 |

(Continued)

*Primary Examiner* — Randy W Gibson
(74) *Attorney, Agent, or Firm* — Michael Best & Friedrich LLP

(57) ABSTRACT

A movable and modular device (100) for dynamic weighing of animals includes an identifying module (1) and a weighing module (2). The identifying module (1) includes a supporting structure (11), a processing module (12), a solar panel (13), an antenna (14), and an identifier (15); and a weighing module (2) comprising: a base (20), at least one pair of sidewalls (21), at least one weighing platform (22), at least one load cell (23), and at least one amplifier and transmission box (24). The device (100) is capable of providing the precise weight of each animal passing over the scale, wherein weighing can occur both when the animal stops on the scale and when it moves on the scale, and especially having movable characteristics, without the need for the animals to move from one area to another through a passageway formed between these two areas.

19 Claims, 8 Drawing Sheets

(56) References Cited

U.S. PATENT DOCUMENTS

| | | | | |
|---|---|---|---|---|
| 4,470,471 A * | 9/1984 | Mills | G01G 21/12 177/132 |
| 4,850,441 A * | 7/1989 | Mosdal | G01G 17/08 177/136 |
| 4,905,780 A * | 3/1990 | Goff, III | G01G 17/08 177/136 |
| 4,984,644 A * | 1/1991 | Skibinski | G01G 3/10 177/132 |
| 5,111,897 A * | 5/1992 | Snyder | G01P 3/64 177/1 |
| 5,734,128 A * | 3/1998 | Gades | G01G 17/08 177/132 |
| 6,805,078 B2 * | 10/2004 | Zimmerman | A01K 29/00 119/842 |
| 7,129,423 B2 * | 10/2006 | Baarsch | A01K 1/0023 177/25.13 |
| 7,598,463 B2 * | 10/2009 | Kleinsasser | G01G 17/08 119/842 |
| 2020/0319014 A1 * | 10/2020 | Mitchell | A01K 5/0107 |

FOREIGN PATENT DOCUMENTS

| | | |
|---|---|---|
| BR | 102015032319-0 A2 | 6/2017 |
| BR | 102017028286-4 A2 | 7/2019 |
| JP | H04-309823 A | 11/1992 |

\* cited by examiner

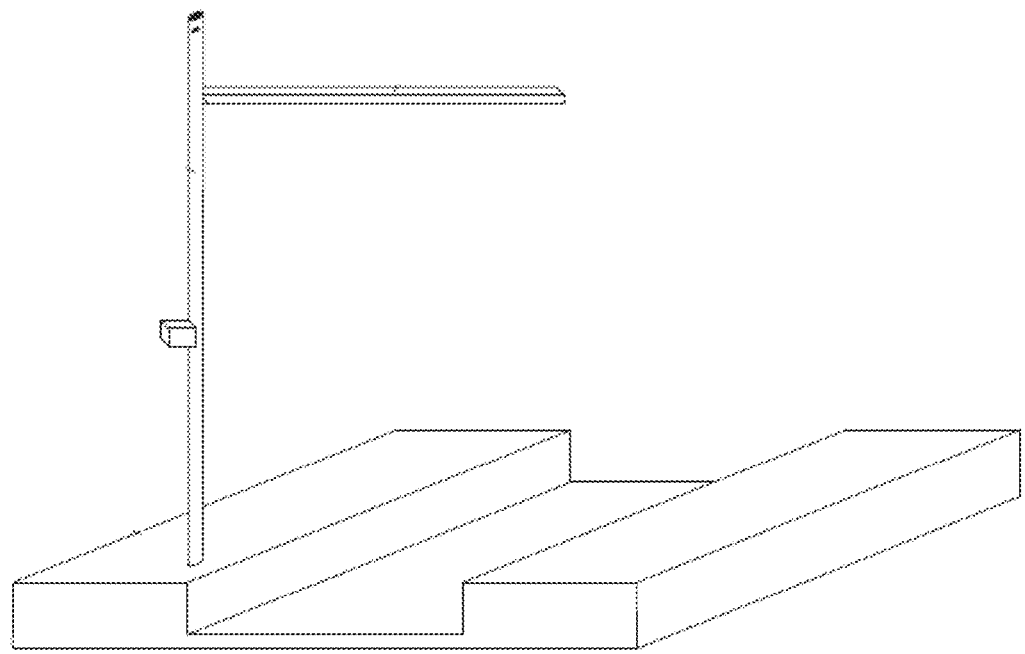
Figure 1.1
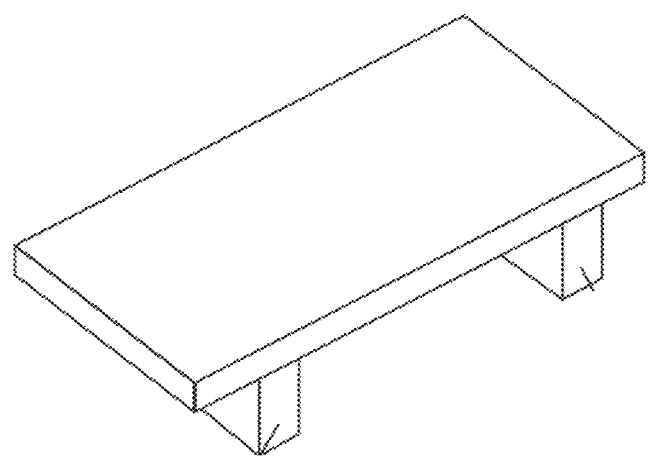
Figure 1.2

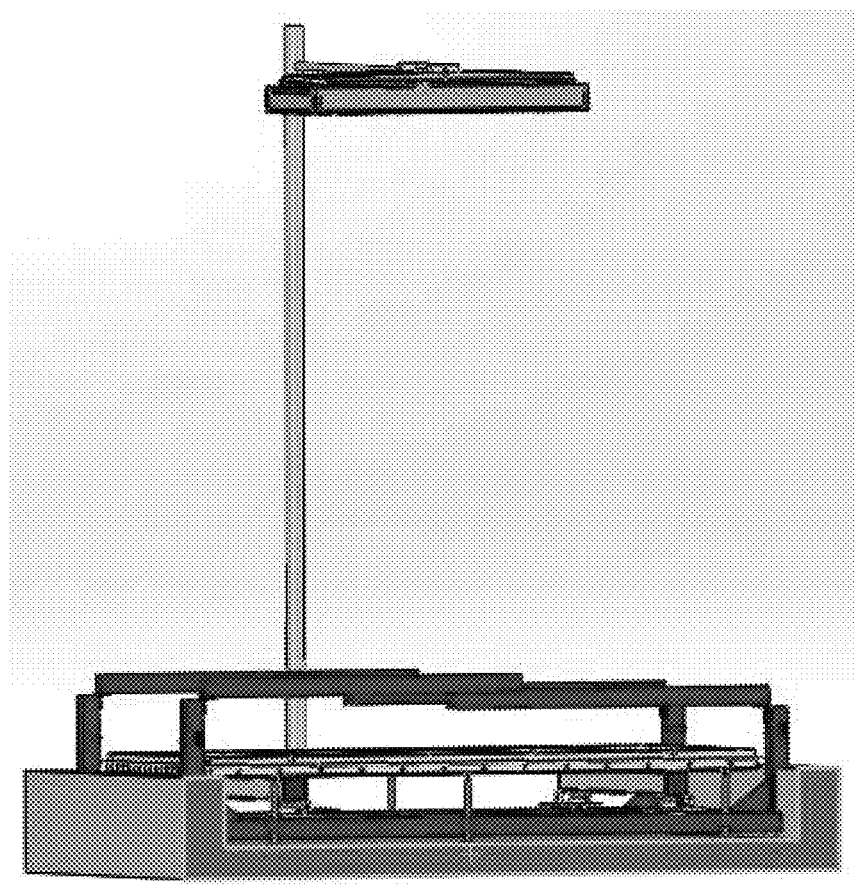
Figure 2.1

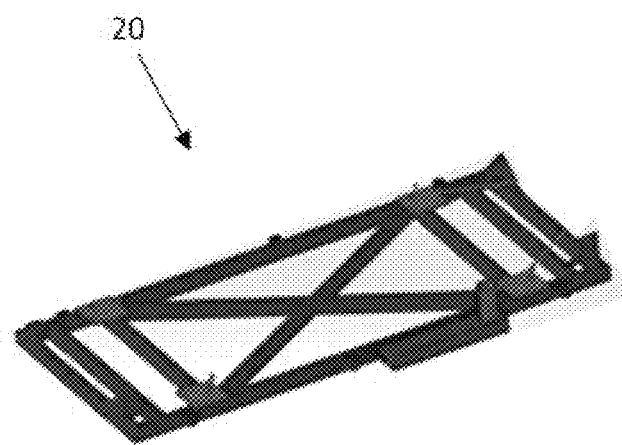
Figure 2.2
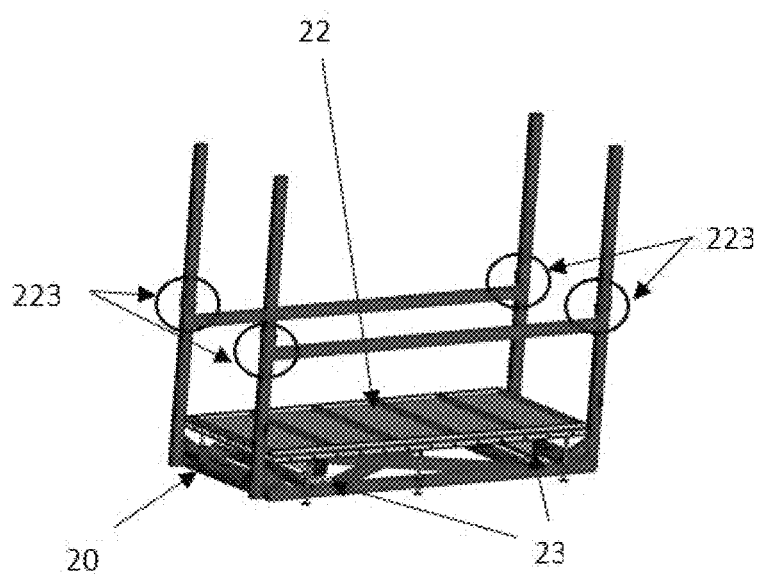
Figure 2.3

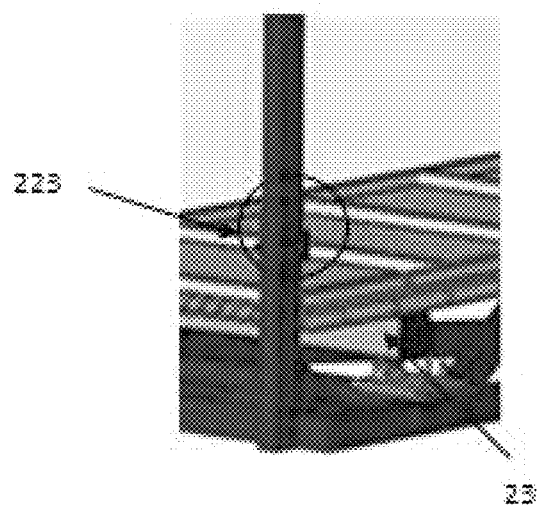
Figure 2.4
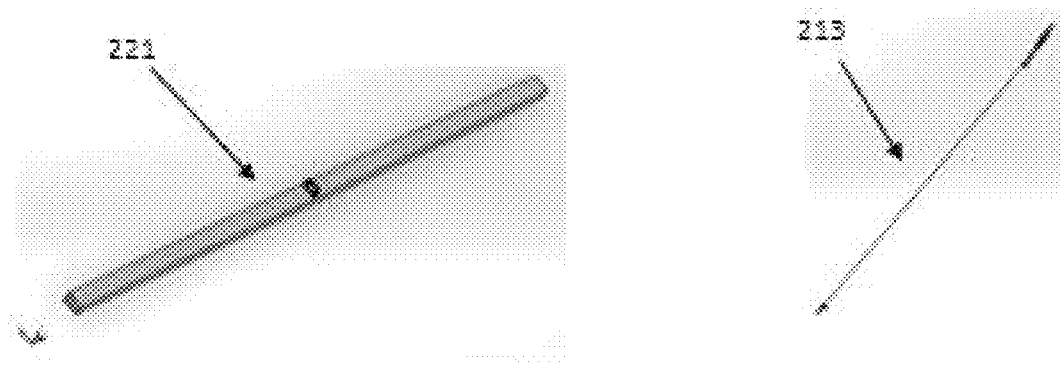
Figure 2.5

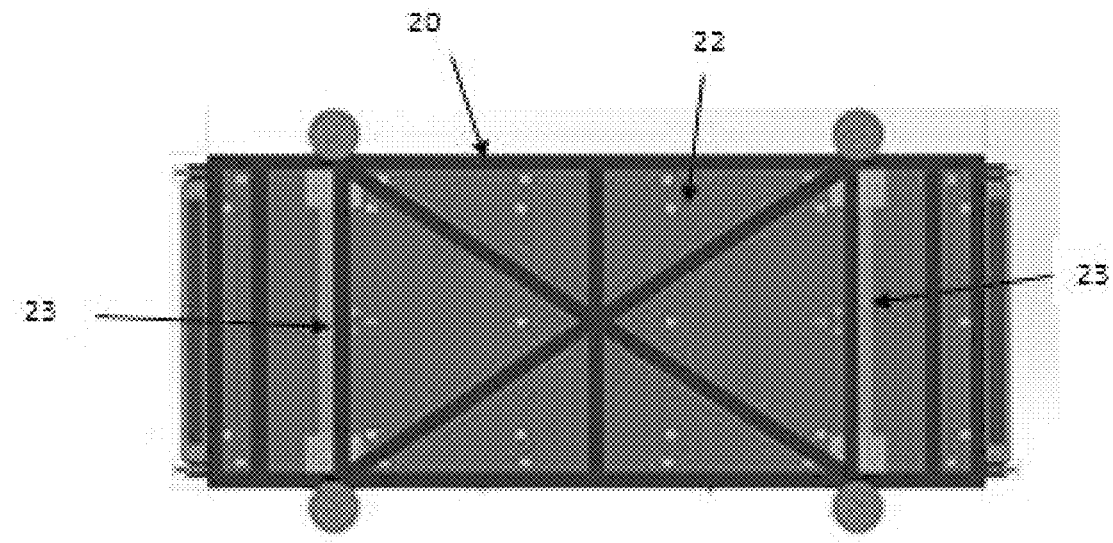
Figure 2.6
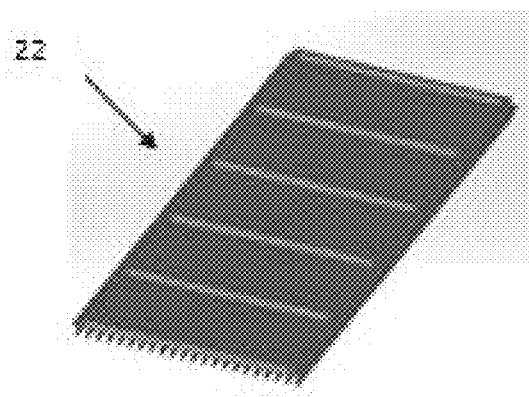
Figure 2.7

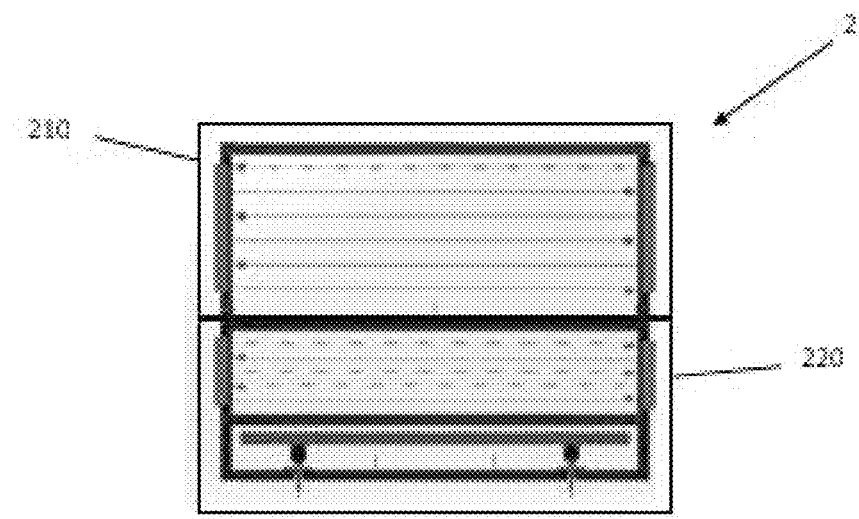
Figure 2.8
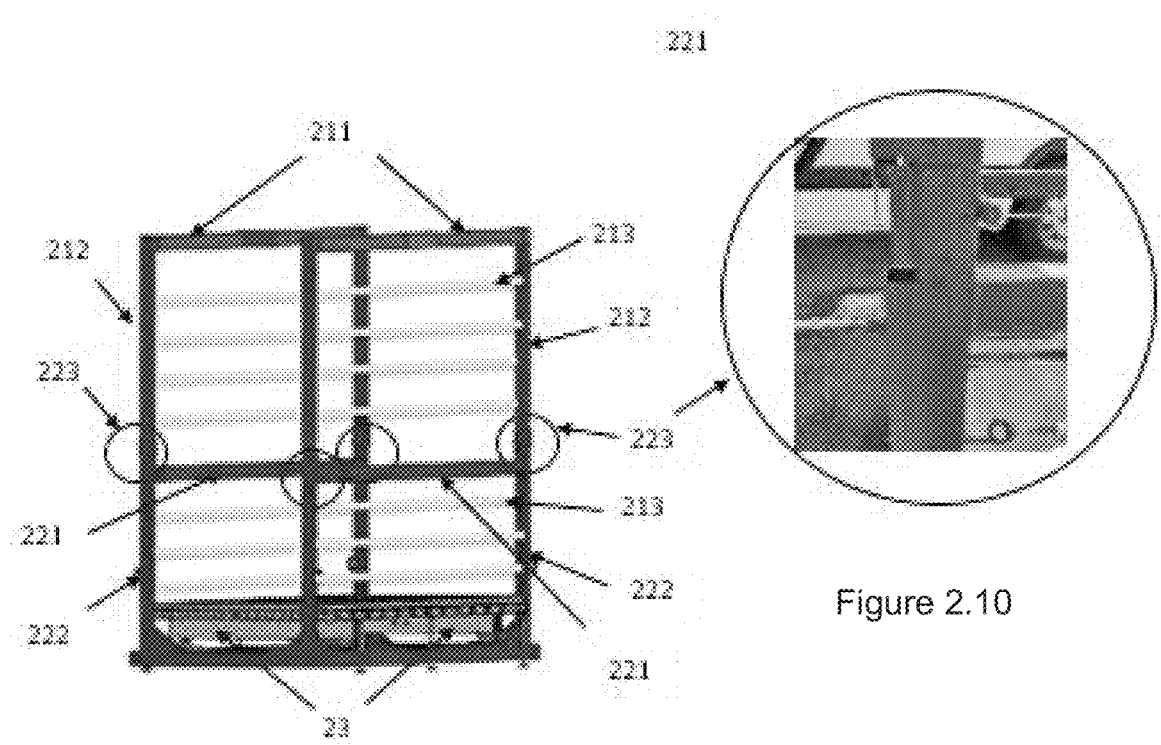
Figure 2.10
Figure 2.9

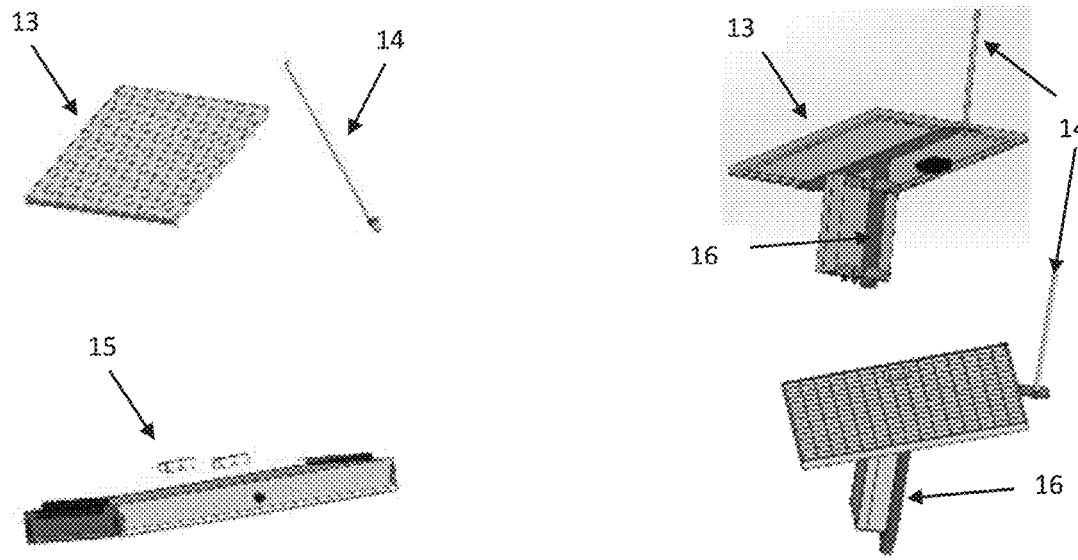
Figure 3.2
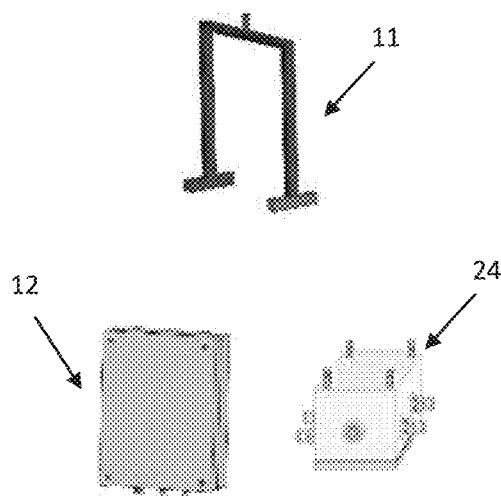
Figure 3.1
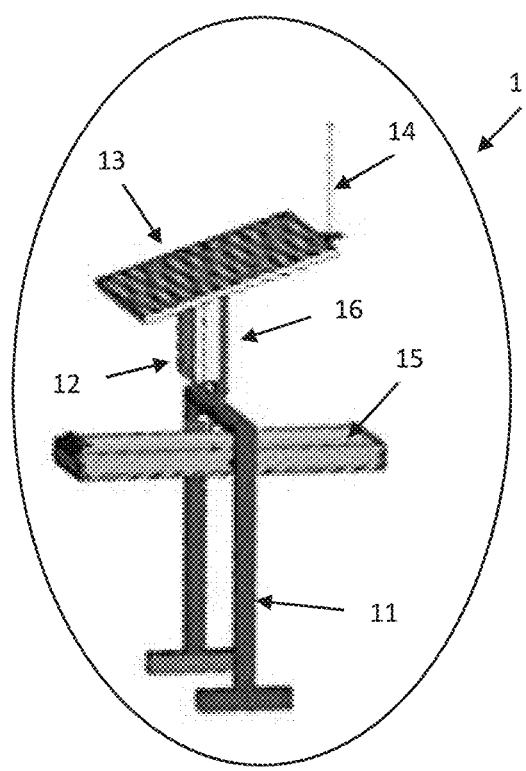
Figure 3.3

MOVABLE AND MODULAR DEVICE FOR DYNAMIC WEIGHING OF ANIMALS

BACKGROUND OF THE INVENTION

The present invention relates to a movable device for dynamic weighing of animals.

The present invention refers precisely to a movable and modular device for dynamic weighing of animals, for example cattle, which makes it possible to provide precise weight measurement of each animal passing over the scale in a given area without the need for the animals to move to another area through a passage formed between these two areas.

It should be noted that in the livestock sector, there is a need to weigh cattle, among others, in order to follow up their growth and therefore their weight. To this end, cattle is normally passed through passages that limit the animal's ability to move, such as a passageway formed between two areas where the animal is located. In this passage a scale is installed so as to ensure that each animal passing across these two areas passes over the scale.

As known from the state of the art, several solutions have been developed in an attempt to solve the problem of animal weighing, such as that presented in JP4309823, which describes a dynamic weighing system in which weighing data is leveled and processed so as to calculate a periodicity.

The applicant's own document BR102015026489-5 describes an animal weighing platform provided with a plate, a load cell, a plate-mounted accelerometer and a processing unit capable of identifying and processing data provided by at least one load cell, wherein the cell includes a diagnostic module capable of identifying and processing data provided by the accelerometer.

Document BR102017028286-4, also by the applicant itself, describes a device for identifying animals passing by, which is installed in passageways defined by streets of a rural facility, the device having a simplified construction configuration capable of covering from narrow passageways to wider passageways, having excellent signal coverage due to the reduced installation height.

Document PI 0505959-3 describes a poultry weighing system that consists of weighing platforms installed in sheds, provided with communication modules, which collect data from the scales and communicate them to computers.

However, as can be seen, the state of the art does not provide a movable and modular device for dynamic weighing of animals, which is capable of providing the precise weight of each animal passing over the scale, wherein weighing can occur both when the animal stops on the scale and when it moves on it, and especially having movable characteristics, without the need for the animals to move from one area to another through a passageway formed between these two areas.

SUMMARY OF THE INVENTION

The purpose of the present invention is to provide a movable and modular device for dynamic weighing of animals, which is capable of providing the precise weight of each animal passing over the scale, wherein the animal can be weighed when it stops on the scale or passing over it, and especially having movable characteristics, without the need for the animals to move from one area to another through a passageway formed between these two areas, hence improving the known devices.

The invention is actually intended to provide a movable and modular device for dynamic weighing of animals including an identifying module and a weighing module, the identifying module includes:
a supporting structure;
a processing module;
a solar panel;
an antenna; and
an identifier; and
the weighing module includes:
a base
at least one pair of sidewalls;
at least one weighing platform;
at least one load cell; and
at least one amplifier and transmission box.

Further, the invention takes advantage of the fact that the at least one sidewall comprises a fixed portion and a movable portion, wherein each fixed portion comprises at least one central longitudinal stringer, at least one cable and at least one pair of fixed side stringers arranged perpendicularly to the base, and wherein each movable portion comprises at least one upper stringer, at least one pair of movable side stringers and at least one cable.

The device according to the present invention does not require the animal to pass over the weighing platform for a long period of time as it is not intended to measure the frequency or periodicity of passage of the animal. In order to achieve a reliable measurement of the animal's weight, it is sufficient for the device to be sized as to fit all the animal's paws on its weighing platform.

BRIEF DESCRIPTION OF THE DRAWINGS

The invention is detailed below by the description of a preferred embodiment, which is exemplified by the figures, in which:

FIG. 1.1 is a perspective view of an animal passage identifying device of the state of the art;

FIG. 1.2 is a perspective view of an animal weighing platform of the state of the art;

FIG. 2.1 is a perspective view of a first step of the development of the object of the present invention;

FIG. 2.2 is a perspective view of the base, a component of the weighing module;

FIG. 2.3 is a perspective view of the weighing module assembled with a few components;

FIG. 2.4 is a perspective view of a detailing of FIG. 3.2 depicting some components of the weighing module;

FIG. 2.5 is a perspective view of further components of the weighing module;

FIG. 2.6 is a lower view of the device providing details of some of the weighing module components;

FIG. 2.7 is a perspective view of the platform, a component of the weighing module;

FIG. 2.8 is a side view of the sidewall, one of the components of the device of the present invention;

FIG. 2.9 is a perspective view of the weighing module with all its components;

FIG. 2.10 is a detailed view of the sidewall pivoting mode, a component of the device of the present invention;

FIG. 3.1 is an exploded perspective view of the identifying module components, which is part of the object of the present invention;

FIG. 3.2 is a perspective view of some components of the weighing module in an assemble state;

FIG. 3.3 is a perspective view of the identifying module with all its components in an assembled state.

DETAILED DESCRIPTION

Figure 4:
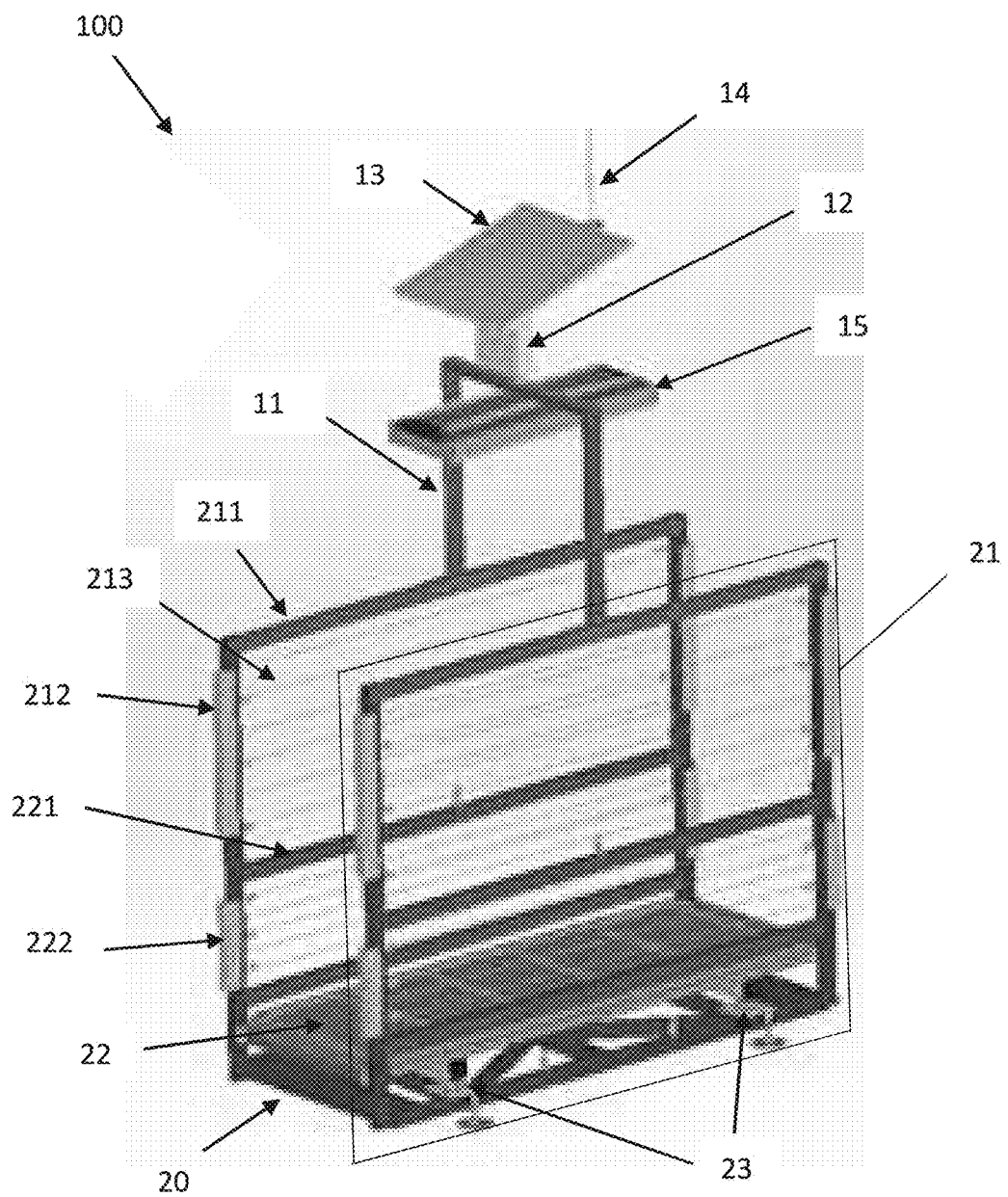
FIG. 4 is a perspective view of the movable and modular device for dynamic weighing of animals of the present invention.

It should be noted that the use of the passing device in conjunction with the platform forms an animal weighing system which enables weighing of animals, particularly quadrupedals. However, the use of such weighing system comprising the passing device and the platform does not allow such system to be moved since the accommodation and/or placement of the system requires it to be fixed at a specific place, not permitting for example transfer thereof to another location.

FIGS. 1.1 and 1.2 represent an animal weighing device of the state of the art, where FIG. 1.1 in particular illustrates a passage identifying device and FIG. 1.2 illustrates an animal weighing platform.

The present invention, in turn, has been designed to allow the movement of the movable and modular device for dynamic weighing of animals 100, so as to eliminate the need for transferring or moving the animal across pastures for them to be weighed. In other words, the purpose of the present invention was to give mobility to the system and make it more useful for the farmer, so that it can be used several times to measure weight of cattle from different production sites creating a GPD curve database (growth rate).

However, it is important to clarify that until the definition of the preferential implementation of the device 100, object of the present invention, some other solutions were provided, where in a first attempt a structure or weighing module 2 was developed including a simple, folding, easy to assemble mechanical system.

Said weighing module 2 has been designed to contain a set of fully folding galvanized steel frames, which facilitates its transportation, storage and assembly. The mechanical portion of such module 2 contains a rectangular base 20 with four fixing level screws to ensure that the entire side of the scale is at the same level of the ground, as seen in FIG. 2.2.

It can be seen from FIG. 2.3 that the module walls 2 were made with the same galvanized steel frames of the base 20, and most of the structures were produced in a folding configuration, allowing their disassembly. In the structure of base 20, a pole support was also idealized, in addition to sealing devices in order to fill the gap between the structure and the platform, thereby helping to keep the load cells 23 clean, as the cells 23 are located below the platform 22.

In an attempt to build device 1, it was also designed that the identifier 15, which is responsible for RFID reading, was mounted on a tube, which in turn was connected to a pole support fixed to base 20. In addition, the processing module, also known as field box, was coupled to the same tube. Besides, the processing module 12 contains the transmitter responsible for sending the collected data to the software in the cloud from Bosch, the applicant. Thus, this fully integrated system works to read the RFID tag, collect the cattle weight and send it to the cloud. After this process, the collected information becomes available in the applicant's application/software, which can be accessed by the user through a mobile phone, computer or tablet.

However, the precision livestock system for farm management will work properly only if the cattle passes over the scale in the correct direction. To solve this problem wooden fence poles are currently installed around the module.

In order to maintain the mobility feature of the system, this first version of device 1 has steel cables 213 coupled to its side walls 21 to create fences attached to the mechanical structure and hence, since cables 213 are fixed to the sidewalls 21 and then crossed over these bars, the cables 213 prevent cattle from crossing the platform 22 from the wrong side and/or in the wrong direction.

Still with respect to the device 100, when it is folded or disassembled, all walls 21 are horizontally reclined making the structure more compact, thus facilitating its transportation.

However, for this first version of the device 100, earthmoving (foundation) was required to stabilize the structure in the ground. Given that the first version of device 100 required earthmoving, in order to simplify this process an optional alternative was created using a concrete base structure added to the mechanical structure to level it with the ground. Thus, to the mechanical structure a concrete base was added, which in addition to improving stability, also allows displacement to different production sites.

Aiming to allow a safer transport of the device 100 and also to ensure that the identifier 15 was not damaged by the animals, either intentionally or accidentally, in a second stage, the positioning of identifier 15 was improved. To this end, the concept of aggregating several components in a single piece was used, and hence a supporting structure 11 was created, allowing the association between the support 16 and the identifier 15. It should be noted that the support 16 in turn enables the association between the processing module 12, the solar panel 13 and the antenna 14, and thus, together with the supporting structure 11 and the identifier 15, they form the identifying module 1, as seen in FIGS. 3.1 to 3.3.

Still regarding the second development stage of the device 100, the weighing module 2 was modified to improve the design. The developed weighing module 2 still includes a folding mechanical system, simple to be assembled with the same base 20 and with the new identifying module 1.

This new identifying module 1, which contains the supporting structure 11, the processing module 12, the solar panel 13, the antenna 14 and the identifier 15, has been installed on top of the weighing module 2.

Also concerning the identifying module 1, specifically on the supporting structure 11, it has a geometry similar to that of an easel, and is intended to support the electronic components, the processing module 12, the solar panel 13 and the antenna 14. Similarly to device 100 in its entirety, the supporting structure 11 is made of galvanized steel structures and is coupled above the two parallel upper stringers 211 of the weighing module 2, as shown in FIG. 4.4.

Essentially, and as can be seen mainly in FIGS. 3.1 and 3.3, the supporting structure 11 includes three small bars, two vertical ones parallel to the weighing module 2 and a crossbar connecting the two bars, similarly to an easel frame. In addition, such supporting structure 11 can be easily pivoted or even disassembled by simply unscrewing the screws attached to the upper stringers 211.

Thus, the identifier 15, also known as RFID reading system, was mounted on the upper part of said supporting structure 11, located in the middle of the crossbar or upper bar. It is further noted that in the supporting structure 11 there is also a tube which acts as a mount for placing the support 16 and hence the processing module 12, the solar panel 13 and the antenna 14. Therefore, verticalization of this entire module made it possible to improve the design, rendering it more compact and lightweight. This is because the tube used and developed as a mount to the RFID system in the first stage was too heavy and dangerous. Then in the second stage it was modified to this new supporting structure 11 so as to facilitate transportation. Moreover, supporting structure 11 is useful for leveling the sidewalls 21 of the entire device 100.

Finally, in this second step, two central, longitudinal stringers 221 were added, one on each sidewall 21 of the weighing module 2, also made of galvanized steel, wherein each one of them was arranged between two fixed side stringers 222 attached to the base 20 of the device 100. Thus, these new central, longitudinal stringers 221 improved the structure strength and limited the axial movement of the fixed side stringers 222. In addition, when the device 100 is disassembled, the two movable side stringers 212 are pivoted/folded, however, the fixed side stringers 222 and the cables 213 mounted between the two fixed side stringers 222 and the base 20 will be intact. It follows that after mounting this system these 213 cables do not require recalibration.

In a preferential implementation, the device 100, object of the present invention, is comprised of two main modules, the first being designated as identification module 1 and the second being designated as weighing module 2. Identifying module 1 comprises a RFID reading system and the electronic components used in the device, being responsible for the identification of the quadrupedal animal and for communicating information to a management system, such as that provided by patent application BR 10 2015 032319 0.

As seen in FIGS. 3.3 and 4, the preferential implementation of the movable and modular device 100 for dynamic cattle weighing, object of the present invention, includes an identifying module 1 and a weighing module 2, the identifying module 1 including: a supporting structure 11, a processing module 12, a solar panel 13, an antenna 14, and an identifier 15; and a weighing module 2 comprising: a base 20, at least one pair of sidewalls 21, at least one weighing platform 22, at least one load cell 23, and at least one amplifier and transmission box 24.

Specifically concerning the supporting structure 11 of the identifying module 1, it has the following dimensions: 750 mm in width or opening, 850 mm in height, a tube for fitting the support 16 having a diameter of 40 mm, which dimensions allow the association between the supporting structure 11 and the weighing module 2 through the movable portion 210 of the side wall 21. Furthermore, it is important to note that the supporting structure 11 is pivotally associated with the upper stringer 211.

FIG. 3.3 further shows that the processing module 12, the identifier 15, the solar panel 13 and the antenna 14 are associated with the supporting structure 11; and in particular, the processing module 12, the solar panel 13 and the antenna 14 are attached to the support 16, and the support 16 in turn associates with the supporting structure 11.

With respect to weighing module 2, and as seen in several figures, including FIG. 4, the module is basically comprised of at least one pair of sidewalls 21, at least one weighing platform 22, at least a pair of load cells 23, and by an amplifier and transmission box 24, these components being associated with the base 20.

FIGS. 2.8 and 2.9 illustrate the basic settings of each of the at least one sidewall 21, comprising a fixed portion 220 and a movable portion 210. Each fixed portion 220 comprising at least one central longitudinal stringer 221, at least one cable 213 and at least one pair of fixed side stringers 222 placed perpendicularly to the base 20. Each movable portion 210 comprises at least one upper stringer 211, at least one pair of movable side stringers 212 and at least one cable 213. In the preferential implementation of the device 100, object of the present invention, the fixed portion 220 of each sidewall 21 comprises four cables 213, which not only prevent animals from crossing the device 100 in the wrong direction but also assist in the structure of the sidewall 21.

In addition, and still with respect to sidewall 21, each sidewall 21 is longitudinally associated with the base 20 through at least one pair of fixed side stringers 222 by the opposite end of at least one upper stringer 211. It should also be noted that the movable portion 210 is pivotally associated with the fixed portion 220 at the end of the fixed side stringers 222 opposed to the base 20.

Also, the movable portion 210 further comprises at least one rod 214 disposed between the at least one pair of movable stringers 212, causing the wall 21 to be vertically parallel and the cables 213 to be stretched, thereby allowing a perfect fit of the upper stringer 211. In the preferential implementation each movable portion 210 has a length of 2080 mm, height of 856 mm, the tubular profiles being 40 mm×60 mm. Furthermore, each fixed portion has a length of 2080 mm, a height of 870 mm, and the same profiles as the movable portion, a 40 mm×60 mm tubular profile.

Also, this setting of the walls 21 allows the movable portion 210 to pivot relative to the fixed portion 220, making transportation of the device 100 secure, because since the movable portions 210 pivot/tilt, the total height of the device will reduce significantly, hence providing better stability during transportation.

As an additional information, the base 20 is 2080 mm in length and 900 mm in width, and the platform 22 is 2000 mm in length and 840 mm in width.

Preferred features which may complement the device according to the invention are set forth below. The device may include one of these features or a combination of these features.

The load cell 23 includes a weighing bar placed transversely to the weighing platform 22 beneath it. The weighing bar includes a load cell 23 at each end.

It is noteworthy that the cables of the electronic devices of the identifying module 1, namely the solar panel 13, antenna 14, identifier 15 and amplifier and transmission box 24 cables in processing module 12. One can also identify each cable with a unique color ring so that connection will be made by the cable ring color.

It is also provided in the device 100, object of the present invention, cavities in the base 20, since there are positioners welded therein. This cavity aid to keep the load cells 23 clean, further eliminating the gap between the walls 21 and the platform 22 thus preventing the animal from getting injured.

Having described a preferred implementation example, it should be understood that the scope of the present invention encompasses other possible variations, being limited only by the content of the appended claims, including any possible equivalents thereof.

What is claimed is:

1. A movable and modular device for dynamic weighing of animals, including an identifying module (1) and a weighing module (2), characterized in that:

the identifying module (1) includes:
a supporting structure (11);
a processing module (12);
a solar panel (13);
an antenna (14); and
an identifier (15); and
the weighing module (2) includes:
a base (20)
at least one pair of sidewalls (21);

at least one weighing platform (22);
at least one load cell (23); and
at least one amplifier and transmission box (24);
wherein opposed sidewalls (21) of the at least one pair of sidewalls (21) define a passageway therebetween for movement of an animal across the at least one weighing platform (22) and alongside the opposed sidewalls (21), wherein each of the opposed sidewalls (21) comprises a lower fixed portion (220) and an upper movable portion (210) configured to pivot relative to the lower fixed portion (220).

2. The device according to claim 1, characterized in that:
the processing module (12), the identifier (15), the solar panel (13) and the antenna (14) are associated in the supporting structure (11); and
the at least one pair of side walls (21), the at least one weighing platform (22), the at least one pair of load cells (23), and the amplifier and transmission box (24) are associated in the base (20).

3. The device according to claim 1, characterized in that the processing module (12), the solar panel (13) and the antenna (14) are attached to a support (16) and the support (16) is associated with the supporting structure (11).

4. The device according to claim 1, characterized in that each fixed portion (220) comprises at least one central longitudinal stringer (221), at least one cable (213) and at least one pair of fixed side stringers (222) placed perpendicularly to the base (20).

5. The device according to claim 1, characterized in that each movable portion (210) comprises at least one upper stringer (211), at least one pair of movable side stringers (212) and at least one cable (213).

6. The device according to claim 4, characterized in that each sidewall (21) of the opposed sidewalls (21) is longitudinally associated with the base (20) through the at least one pair of fixed side stringers (222) by the opposite end of the at least one upper stringer (211).

7. The device according to claim 4, characterized in that the movable portion (210) is pivotally associated (223) with the fixed portion (220) at the end of the fixed side stringers (222) at the opposite side of the base (20).

8. The device according to claim 5, characterized in that the supporting structure (11) is pivotally associated with the upper stringer (211).

9. The device according to claim 5, characterized in that each movable portion (210) further comprises at least one rod (214) arranged between the at least one pair of movable stringers (212).

10. The device according to claim 1, wherein for each of the opposed sidewalls (21), the lower fixed portion (220) includes a first fixed side stringer (222) extending vertically from the base (20) and fixed to the base (20), and a second fixed side stringer (222) extending vertically from the base (20) and fixed to the base (20), wherein the first fixed side stringer (222) is spaced longitudinally from the second fixed side stringer (222).

11. The device according to claim 10, wherein for each of the opposed sidewalls (21), the lower fixed portion (220) further includes a central, longitudinal stringer (221) extending longitudinally between the first fixed side stringer (222) and the second fixed side stringer (222).

12. The device according to claim 10, wherein for each of the opposed sidewalls (21), the lower fixed portion (220) further includes a plurality of steel cables (213) extending longitudinally between the first fixed side stringer (222) and the second fixed side stringer (222).

13. The device according to claim 10, wherein for each of the opposed sidewalls (21), the upper movable portion (210) includes a first movable side stringer (212) extending vertically and pivotally coupled to the first fixed side stringer (222) at a lower end of the first movable side stringer (212), and a second movable side stringer (212) extending vertically and pivotally coupled to the second fixed stringer (222) at a lower end of the second movable side stringer (212).

14. The device according to claim 13, wherein for each of the opposed sidewalls (21), the upper movable portion (210) further includes a plurality of steel cables (213) extending longitudinally between the first movable side stringer (212) and the second movable side stringer (212).

15. The device according to claim 13, wherein for each of the opposed sidewalls (21), the upper movable portion (210) further includes an upper stringer (211) extending longitudinally between the first movable side stringer (212) and the second movable side stringer (212), wherein the supporting structure (11) is releasably coupled to the upper stringer (211).

16. The device according to claim 1, wherein each of the opposed sidewalls (21) includes an upper stringer (211), wherein the supporting structure (11) is releasably coupled to the upper stringers (211).

17. The device according to claim 16, wherein the supporting structure (11) includes two vertically-extending bars and a cross-bar connecting the two vertically-extending bars.

18. The device according to claim 1, wherein for each of the opposed sidewalls (21), the upper movable portion (210) includes a first movable side stringer (212) extending vertically and pivotally coupled to the lower fixed portion (220), and a second movable side stringer (212) extending vertically and pivotally coupled to the lower fixed portion (220).

19. The device according to claim 1, wherein for each of the opposed sidewalls (21), the lower fixed portion (220) includes a first fixed side stringer (222) and a second fixed side stringer (222), and a central, longitudinal stringer (221) extending longitudinally between the first fixed side stringer (222) and the second fixed side stringer (222).

* * * * *